United States Patent [19]

Filipow et al.

[11] Patent Number: 4,959,979
[45] Date of Patent: Oct. 2, 1990

[54] SECURITY DEVICE FOR A FRONT-LOADING VCR

[76] Inventors: Catherine M. Filipow, 109 - 2166 Loyola Avenue, Gloucester, Ontario, K1J 8H5; Arthur R. Whited, 308 - 3540 Peter Street, Windsor, Ontario, N9C 4C1, Canada

[21] Appl. No.: 225,257

[22] Filed: Jul. 28, 1988

[51] Int. Cl.$^5$ ............................................. E05B 73/00
[52] U.S. Cl. ......................................... 70/58; 70/163; 70/169
[58] Field of Search ............... 70/14, 57, 58, 158–173; 220/334, 377, 82 R

[56] References Cited

U.S. PATENT DOCUMENTS

| | | | |
|---|---|---|---|
| 858,781 | 7/1907 | Benedict | 70/169 |
| 897,046 | 8/1908 | Armstrong | 70/169 |
| 965,590 | 7/1910 | Lokody | 70/169 |
| 1,004,449 | 9/1911 | Markovitz | 70/169 |
| 1,015,907 | 1/1912 | Ryder | 70/169 X |
| 1,656,275 | 1/1928 | Hurd | 70/162 |
| 1,754,074 | 4/1930 | Atkinson | 70/169 |
| 1,977,493 | 10/1934 | Scott | 70/169 X |
| 2,228,694 | 1/1941 | De Hoffmann | 70/173 |
| 2,819,692 | 1/1958 | Johnson et al. | 70/168 X |
| 3,276,835 | 10/1966 | Hall | 70/169 X |
| 4,131,001 | 12/1978 | Gotto | 70/14 |
| 4,527,405 | 7/1985 | Renick et al. | 70/58 X |
| 4,616,490 | 10/1986 | Robbins | 70/168 X |
| 4,628,713 | 12/1986 | Cecchi et al. | 70/58 |
| 4,629,089 | 12/1986 | Federico et al. | 220/82 R X |
| 4,655,057 | 4/1987 | Derman | 70/58 X |

FOREIGN PATENT DOCUMENTS 2316448  4/1973  Fed. Rep. of Germany .......... 70/14

Primary Examiner—Gary L. Smith
Assistant Examiner—Suzanne L. Dino
Attorney, Agent, or Firm—Sixbey, Friedman, Leedom & Ferguson

[57] ABSTRACT

A security device for front-loading VCRs, to prevent access to the interior of the VCR when the device is in place. It comprises a body which is releasably insertable into position in the cassette-receiving opening of the VCR, the body being shaped so as to obstruct access to the interior of the VCR through that opening when it is in position. A lock operable when the body is in position, releasably locks the body in that position.

6 Claims, 2 Drawing Sheets

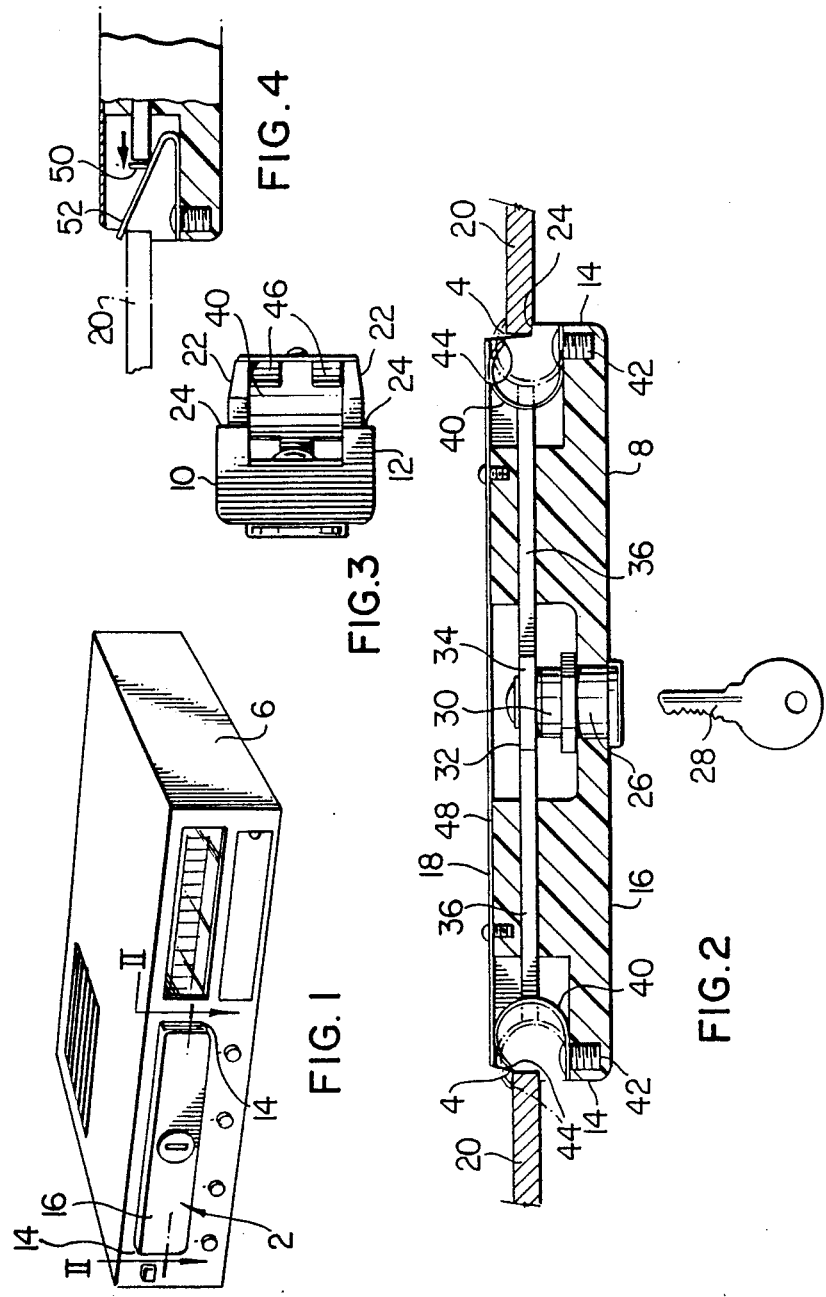

SECURITY DEVICE FOR A FRONT-LOADING VCR

BACKGROUND OF THE INVENTION

The present invention relates to a security device for a front-loading VCR, and more particularly relates to a device which prevents the VCR from being used, or obstructs access to its interior mechanisms, when the device is in place.

Protective devices for child-proofing VCRs have become very desirable with the increasing number of VCRs in households. Small children may, for example, insert objects through the cassette-receiving opening of the VCR, which can readily damage the mechanical and electronic components housed within the walls of the VCR cabinet.

One solution to this problem is described and illustrated in Federico et al U.S. Pat. No. 4,629,089 issued Dec. 16, 1986, in which a panel is provided within which the VCR sits, the panel covering the VCR controls. The panel may be opened by an appropriate lock mechanism when it is desired to use the VCR.

Other devices of general background interest, for providing security for VCRs, include a lockable cassette which has a built-in alarm system. The cassette is inserted into the VCR, just like any other cassette, and activated by a key. Any subsequent disturbance of the VCR is then detected, sounding a siren alarm. U.S Pat. No. 4,628,713 of Cecchi et al issued Dec. 16, 1986 describes and illustrates a lock device for videotape cassettes per se, whereby a cassette may itself be locked to prevent its playing.

It is an object of the present invention to provide a simple and effective means for preventing access to the interior of a VCR. It is a further object of the present invention to provide a means to prevent, as desired, a VCR from being used.

SUMMARY OF THE INVENTION

In accordance with the present invention there is provided a security device for a front-loading VCR having a cassette-receiving opening defined by walls of the VCR casing, to prevent the VCR from being used or to obstruct access to its interior. The device comprises a body mountable on the VCR in position to cover the cassette-receiving opening, so as to obstruct access to the interior of the VCR through that opening. Clamp means are provided on the body, movable to clamping position interact with the VCR case and walls to releasably secure the body in position. Lock means are associated with the clamp means to lock the clamp means in clamping position. In a preferred embodiment, a portion of the body is insertable into position in the cassette-receiving opening of the VCR with the rest of the body protruding beyond the front of the VCR. The body is provided with a circumscribing step ledge surface to abut against the front of the VCR when the device is in position. The body is shaped so as to obstruct access to the interior of the VCR through its cassette-receiving opening when the body is in position in said opening. The clamp means comprises a pair of extension means operatively associated with the lock means and movably secured to the body to extend into clamping position engaging the VCR walls defining the VCR opening when the lock means is locked, and to be in retracted position, clear of those walls, when the lock means is in unlocked position so as to permit unobstructed removal of the body from its position in the cassette-receiving opening of the VCR. The lock means preferably comprises a key activated lock cylinder rotatably mounted on the body, a key slot means for the cylinder being provided on the front of the body. The exterior means preferably comprises a cam secured to the lock cylinder to rotate therewith and rod means slidably extending between the cam surface and the sides of the body. The cam and the rod means are positioned and co-operate so that when the lock means is in locked position the cam is in operative position causing portions of the rod means to extend outwardly from the body to lodge behind the walls defining the cassette-receiving opening of the VCR. When the lock means is in unlocked position, the cam is in inoperative position with the rod means retracted to be clear of those walls.

The device in accordance with the present invention, may be readily locked in position to plug the cassette-receiving opening of the VCR. When in that position, a child will be unable to insert objects through the opening or probe with objects or fingers the interior of the VCR through that opening. It is easily positionable over and removable from the opening and thus is an extremely simple and effective device for its intended purpose.

BRIEF DESCRIPTION OF THE DRAWINGS

These and other objects and advantages of the invention will become apparent upon reading the following detailed description and upon referring to the drawings in which:

FIG. 1 is a perspective view of a VCR in which a device in accordance with the present invention has been mounted;

FIG. 2 is a section view of an example embodiment of the invention, along line II—II of the FIG. 1;

FIG. 3 is a side view of the device of FIGS. 1 and 2.

FIG. 4 is a schematic partial section view of an alternative example embodiment of the device according to the present invention;

Figure 5:
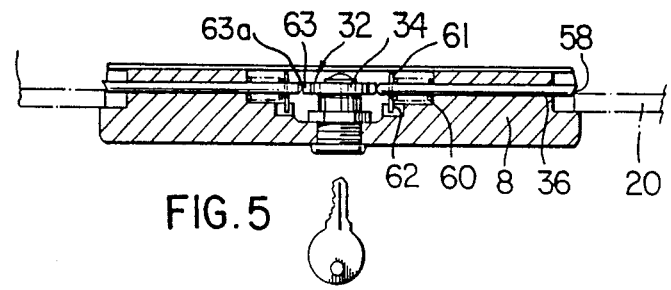
FIGS. 5 and 6 are section views, similar to that of FIG. 2, of alternative embodiments of the device in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to the drawings, a device 2 in accordance with the present invention is illustrated, releasably locked in cassette-receiving opening 4 of a front-loading VCR 6. The device comprises a rectangular body 8 having a top 10, bottom 12, sides 14, front face 16 and a rear 18. As can be seen in FIG. 2, when the device 2 is in operative position, locked in opening 4, a portion of body 8 protudes forwardly beyond the front of the VCR and a portion thereof is inserted through opening 4 and rests within the cabinet walls 20. As can be seen in FIG. 3, the rear portions 22 of the body 8 are bevelled, to facilitate insertion of device 2 in opening 4 and proper alignment of body 8 in opening 4. Circumscribing body 8 along its top 10, bottom 12 and sides 14, is a step ledge 24, to abut against the front surfaces of cabinet walls 20 about opening 4 when device 2 is in position as illustrated in FIGS. 1 and 2. The size and shape of body 8, as can be seen in FIGS. 1 and 2, is such as to obstruct all access to the interior of VCR 6 when device 2 is in position as illustrated.

To secure device 2 in this operative position, a lock 26 is provided, operable by means of a key 28. Lock 26 is installed, as illustrated in FIG. 1, so that the slot for key 28 is positioned on front face 16. Key 28 enables the turning of a lock cylinder 30, to which is secured cam 32. Oval-shaped cam surface 34 which, as cam 32 is turned about an axis perpendicular to front face 16, acts to push sideways, in a direction parallel to that front surface, rods 36 which are slidably mounted in appropriate apertures in body 6 as illustrated. These rods bear against the back surfaces of curved band springs 40, each secured to body 8 by means of rivets 42 at one end in retracted position, as illustrated in FIG. 2. Before cam surface 34 has been turned to force rods 36 sideways, ends 44 of springs 40 are seated within body 8 so that body 8 may be pulled from or inserted into opening 4 freely and without obstruction. When cam 32 has been turned to operative position so that it presses rods 36 outwardly, sideways (phantom, FIG. 2), the outer ends of rods 36 force the back portion 38 of each spring 40, and its respective end 44, outwardly, in a sideways direction so that ends 44 become seated behind corresponding portions of cabinet walls 20 (phantom FIG. 2), thereby preventing removal of device 2 from its locked position in cassette-receiving opening 4. When key 28 is again turned so that cam 32 is returned to its inoperative position, rods 36 are then free to slide back inwardly, to their inoperative positions as illustrated in FIG. 2, this being accomplished under urging from springs 40 returning to their original position as illustrated. Springs 40 are preferably made of high grade steel. Ends 44 of springs 40 are provided with fingers 46 (FIG. 3) to provide increased resiliency and enable greater tolerances for effective operation of the device. This is in part because the thickness of cabinet walls 20 may vary from one VCR unit or manufacturer to another.

A plate 48 is secured to rear 18 of body 8, as illustrated, plate 48 providing additional strength against distortion of springs 40, as would be required for example if someone were to attempt to force device 2, locked in opening 4, out from that opening while the device was still locked. As well, plate 48 provides extra protection against entry from the sides 14, through opening 4, into the interior of VCR 6 through sides 14.

In the alternative embodiment illustrated in schematic, section in FIG. 4, rods 36 are arranged to bear against an extension 50 secured to one side of spring 52 which is secured, in a similar fashion to curved band springs 40, to the body 8 near its sides 14. In this way, the outward, sideways motion of rods 36 causes springs 52 to move outwardly, with respect to body 8, and downwardly, into position adjacent and behind cabinet walls 20 to prevent release of device 2 from its position in opening 4.

The body 8 of device 2 may be made of an appropriate material such as high-grade, durable plastic. Hand grip surfaces (not illustrated) may be provided on exposed surfaces of body 8 to facilitate installation and removal of the device from a VCR.

In the embodiment of FIG. 5, rods 36 are provided with rearwardly and outwardly angled ends 58, so that when cam 32 is rotated to push drive rods 36 outwardly along their longitudinal axis, if the rods themselves do not pass behind the cabinet walls, ends 58 become wedged behind walls 20, beside opening 4, to securely hold device 2 in position. Spring means 60, one end 62 of each of which is abutted to roll pin 61 which in turn is secured to a rod 36 as illustrated, and the other end of which bears against a portion of body 8 as illustrated, ensures that rods 36 are urged back to retracted position, with ends 58 clear of walls 20, so that device 2 may be removed from opening 4, when cam 32 is turned to its unlocked, inoperative position. An appropriate cam follower 63 and override wave washer 63a are provided, on opposite sides of cam 32 between the cam surface 34 and the corresponding end of each rod 36, as illustrated, to permit cam 32 to continue to turn and force at least one of rods 36 outwardly, even if the other of the rods abuts against a portion of cabinet wall 20 in opening 4. This type of override mechanism may be necessary, to ensure proper operation of the device in VCRs having different wall thicknesses. The thickness of the clamped VCR wall may vary slightly from one VCR to another, making this override necessary, as rods 36 may become wedged in position behind walls 20 before cam 32 has turned fully to locked position.

Figure 6:
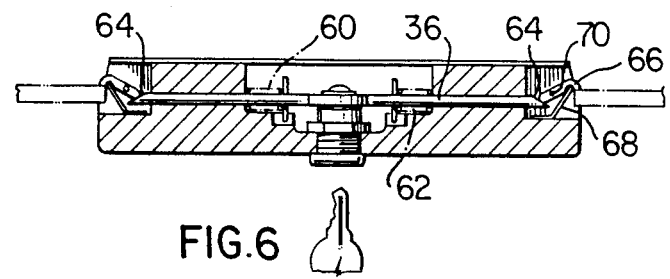

In the device 2 illustrated in FIG. 6, rods 36 are provided with angled ends 64 as illustrated, these ends positioned so that, when cam 32 is rotated to drive rods 36 longitudinally outwardly, they act to rotate hooked clamps 66 outwardly and downwardly into clamping position against the back of cabinet walls 20, as illustrated, for securing device 2 in opening 4. When cam 32 is rotated in the opposite direction, springs 60 ensure retraction of rods 36. As well, finger tortion spring 68 then acts upon each of hook clamps 66 to ensure that they are pivotably retracted from clamping position, by swinging each of the clamp hooks 66 about pivots 70 an appropriate degree.

Figure 7:
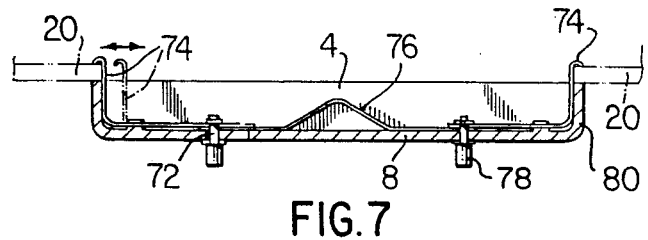
FIG. 7 is a similar section view, to that of FIG. 2, of yet a further alternative embodiment of the present invention.

In the embodiment of FIG. 7, a movable locking pin 72 operates to move into clamping position behind walls 20, the left hand one of finger clamps 74 as illustrated. A leaf spring 76, acting on locking pin 72, tends to urge locking pin 72 and finger clamp 74 associated therewith, into clamped position as illustrated. Movement of locking pin 72 towards leaf spring 76, against its bias, causes the left finger clamp 74 to move inwardly clearing walls 20 so that device 2 may be removed from clamp position in the opening of the VCR. The right hand finger clamp 74 is secured to body 8 by way of stationary pin 78. It should be noted that, in this particular embodiment, body 8 comprises a panel having curved sides 80 the ends of which, when the body is in clamped position over opening 4, sit on the outer sides of walls 20 as illustrated. To place body 8 into clamped position, the right hand finger clamp is positioned behind the corresponding portion of wall 20 on the right hand side of opening 4, and, with body 8 appropriately positioned over opening 4, the left hand clamp 74 is moved outwardly, by appropriate movement of locking pin 72, into position behind the corresponding portion of wall 20 behind the left hand side of opening 4.

As will be understood from the preceding description, with device 2 in unlocked position, it is inserted into opening 4 until the front face of step ledge 24 is in full contact with the front face of VCR 6. Key 28 is inserted into the lock and the lock is rotated, in the illustrated embodiment of FIGS. 1 to 6 and 8, through a full 90° of travel. The key 28, when turned in this manner, rotates cam 32 through 90° and thus pushes the drive rods 36 along their longitudinal axis. In the embodiment of FIGS. 1 to 4, these rods consequently roll the springs 40 (or 52) outwardly from the body 8 until they sit behind and adjacent to the interior surfaces of cabinet walls 20.

Figure 8:
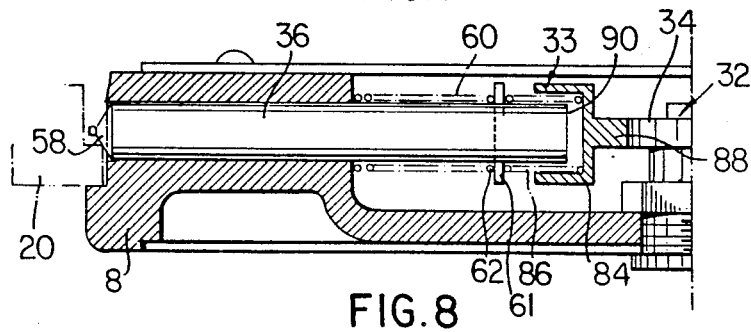
FIG. 8 is a section view, similar to that of FIG. 2, but of half of the device, of yet a further embodiment of the invention, this being a preferred alternative embodiment.

In the embodiment of FIGS. 5 and 8, the rods themselves, at ends 58, bear against the inside portion of walls 20 and, in the embodiment of FIG. 6, the ends of rods 36 act to pivot hook clamps 66 as illustrated. In all of these conditions, device 2 is positively clamped to the front face of VCR 6, and the key may be removed from lock 26. To remove the device 2 from the VCR, key 28 is inserted in lock 20 and turned 90° in the reverse direction.

In the embodiment of FIG. 7, turning of locking pin 1 causes the left hand finger clamp 74 to move into clamping position, the right hand clamp 74 having already been appropriately positioned when the body 8 has been placed in position over opening 4.

In the preferred embodiment of FIG. 8, a construction somewhat similar to that of FIG. 5 is illustrated, having rods 36 which slide outwardly, under urging from cam 32, so that the rods or, as illustrated their angled ends 58, become wedged behind walls 20, beside opening 4, to securely hold device 2 in position. Again a spring means 60, one end of each of which is abutted to roll pin 61 which in turn is secured to rod 36 as illustrated, and the other end of which bears against a portion of body 8 as illustrated, urges rods 36 back to retracted position, with ends 58 clear of walls 20, so that device 2 may be removed from opening 4 when cam 32 is turned to its unlocked, inoperative position. In this embodiment, cam follower 33 comprises a cylindrical-shaped, open-ended stirrup 84, in which a spring 86 is securely seated, one end of the spring 86 being secured to stirrup 84 and the other being abutted to roll pin 61. At the base of stirrup 84 is a protrusion 88 which slidably seats on cam surface 34. As is seen in FIG. 8, the inner end 90 of each rod 36 is circumscribed by spring 86, and is slidably positioned within stirrup 84, with a space "d" provided between end 90 of rod 36 and the inner surface of stirrup 84. Under normal operation, turning of cam 32 towards locking position will force protrusion 88, and stirrup 84, and hence spring 86 and the corresponding rod 36 outwardly into lodged position, as illustrated, behind walls 20. If for some reason however one of the rods becomes lodged against a portion of wall 20 before cam 32 has turned fully to locked position, cam surface 34 can force stirrup 84 outwardly the extra distance "d" without causing the cam to seize and without further movement of rod 36.

As previously indicated, device 2 in accordance with the present invention is designed to permit only authorized use of a VCR in which it is installed, and, when installed in such VCR, prevents the insertion of any foreign substance or objects into opening 4. Device 2 no doubt would also provide a deterrent to VCR theft.

Thus it is apparent that there has been provided in accordance with the invention a security device for a front-loading VCR that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A security device for a front-loading VCR having a cassette-receiving opening defined by walls of the VCR casing, to prevent its being used and to obstruct access to its interior mechanisms, the device comprising a body mountable on the VCR in position to cover the cassette-receiving opening, so as to obstruct access to the interior of the VCR through that opening, clamp means on the body, movable to clamping position interacting with the VCR to releasably secure the body in position, and lock means associated with the clamp means to lock the clamp means in clamping position, wherein the clamp means comprises a pair of extension means operatively associated with the lock means and movably secured to the body to extend outwardly into clamping position engaging the VCR walls defining the VCR opening, when the lock means is locked, and to be in retracted position clear of those walls when the lock means is in unlocked position so as to permit unobstructed removal of the body from its position in the cassette-receiving opening of the VCR, and the lock rotatably mounted in the body, a key slot means for the cylinder being provided on the front of the body, and the clamp means comprises a cam with a cam surface, secured to the lock cylinder to rotate therewith, and rod means slidably extending between the cam surface and the sides of the body, the cam surface and the rod means being positioned and operating so that when the lock means is in locked position the cam is in operative position with portions of the rod means extending outwardly from the body to lodge behind the walls defining the cassette-receiving opening of the VCR, and when the lock means is in unlocked position then the cam is in inoperative position so that the rod means are retracted clear of those walls, and further comprising cam follower means between the rod means and the cam surface to permit the cam to turn fully to operative position even if one of the rod means becomes lodged before the cam has reached that operative position; wherein the rod means comprises a pair of rods, one on each side of the cam, mounted on the body to slide outwardly in opposite directions as the cam is moved to operative position, wherein spring means are associated with the body and the rods to urge the rods inwardly, to inoperative position as the cam is moved from operative to inoperative, and wherein the cam follower comprises a stirrup means spring mounted to the inner end of each of the rods, each stirrup means being normally spaced a predetermined distance from the inner end of each rod and having a portion slidably engaging the cam surface.

2. A device according to claim 1 wherein the body is formed so that a portion thereof is insertable into position in the cassette-receiving opening of the VCR with the rest of the body protruding beyond the front of the VCR, the body being provided with a circumscribing step ledge surface to abut the front of the VCR when the device is in position.

3. A device according to claim 2 wherein the body is of elongated rectangular shape and has sides, a top, a bottom, a front face and a rear.

4. A device according to claim 3 wherein the leading edges of the portion of the body at the rear, which are insertable into the cassette-receiving opening of the VCR, are bevelled to facilitate guiding the body into position.

5. A device according to claim 3 wherein the step ledge surface is positioned on the sides, top and bottom of the body.

6. A device according to claim 3 wherein the lock means comprises a key activated lock mechanism.

* * * * *